(12) United States Patent
Sprenger et al.

(10) Patent No.: US 8,957,335 B2
(45) Date of Patent: Feb. 17, 2015

(54) ELECTRICAL DISCONNECTING DEVICE AND METHOD FOR THE ELECTRICAL ISOLATION OF CONNECTING PARTS WITH THE AID OF A DISCONNECTING DEVICE

(75) Inventors: Oliver Sprenger, Jülich (DE); Frank Gronwald, Bedburg (DE); Wolfgang Hentschel, Schopfheim (DE)

(73) Assignee: Auto Kabel Managementgesellschaft mbH, Hausen i.W. (DE)

( * ) Notice: Subject to any disclaimer, the term of this patent is extended or adjusted under 35 U.S.C. 154(b) by 0 days.

(21) Appl. No.: 13/818,496

(22) PCT Filed: Jun. 16, 2011

(86) PCT No.: PCT/EP2011/059986
§ 371 (c)(1),
(2), (4) Date: Mar. 29, 2013

(87) PCT Pub. No.: WO2012/025272
PCT Pub. Date: Mar. 1, 2012

(65) Prior Publication Data
US 2013/0175144 A1 Jul. 11, 2013

(30) Foreign Application Priority Data
Aug. 27, 2010 (DE) .......................... 10 2010 035 684

(51) Int. Cl.
*H01H 33/75* (2006.01)
*H01H 39/00* (2006.01)
*B23D 15/14* (2006.01)
(52) U.S. Cl.
CPC .......... *H01H 39/006* (2013.01); *B23D 15/145* (2013.01); *H01H 2039/008* (2013.01)
USPC .................................... 200/61.04; 200/61.21

(58) Field of Classification Search
USPC ................ 200/61.04, 61.08, 61.21; 337/157; 218/95, 91, 93
See application file for complete search history.

(56) References Cited

U.S. PATENT DOCUMENTS 2,768,013 A * 10/1956 Hunt ............................... 291/23
3,369,296 A    2/1968 Takahashi ....................... 30/228
(Continued)

FOREIGN PATENT DOCUMENTS

CN    1512527    7/2004    ............ H01H 39/00
DE    1490021    5/1969    .............. H01H 1/12
(Continued)

OTHER PUBLICATIONS

International Searching Authority, International Search Report—International Application No. PCT/EP2011/059986, dated Aug. 23, 2011, together with the Written Opinion of the International Searching Authority, 11 pages.
(Continued)

*Primary Examiner* — Renee S Luebke
*Assistant Examiner* — Ahmed Saeed
(74) *Attorney, Agent, or Firm* — Sunstein Kann Murphy & Timbers LLP (57) ABSTRACT

The invention relates to an electrical isolating device (2) comprising a first connecting part (4*a*), a second connecting part (4*b*), an isolation point (6) which in the closed state forms a current path between the first and the second connecting parts (4*a*, 4*b*) and is located spatially between the connecting parts, wherein in the isolated state the isolation point (6) isolates the current path between the connecting parts (4*a*, 4*b*), and further comprising an auxiliary drive (8) which influences isolation of the isolation point (6). Particularly reliable isolation is ensured in that a flowable medium (10) driven by the auxiliary drive is disposed in such a way that it surrounds the isolation point (6) at least partially at least at the moment of isolation.

21 Claims, 4 Drawing Sheets

(56) References Cited

U.S. PATENT DOCUMENTS

| | | | |
|---|---|---|---|
| 3,384,724 A | 5/1968 | Marx et al. | 200/150 |
| 3,700,970 A | 10/1972 | Miyoshi | 317/58 |
| 3,848,099 A * | 11/1974 | Christian et al. | 200/61.08 |
| 4,183,005 A * | 1/1980 | Meister et al. | 337/275 |
| 6,496,098 B1 * | 12/2002 | Kern et al. | 337/401 |
| 6,556,119 B1 | 4/2003 | Lell | 337/157 |
| 2004/0041682 A1 * | 3/2004 | Pasha et al. | 337/401 |

FOREIGN PATENT DOCUMENTS

| | | | | |
|---|---|---|---|---|
| DE | 1904244 | | 8/1970 | H01H 39/00 |
| DE | 2103565 | | 8/1971 | H01H 39/00 |
| DE | 10139360 | | 3/2003 | H01H 39/00 |
| DE | 102007051504 | | 4/2009 | H01H 39/00 |
| FR | 2079538 | | 11/1971 | H01H 39/00 |
| FR | 2086922 | | 12/1971 | H01H 39/00 |
| GB | 1106032 | * | 3/1968 | H01H 1/12 |
| GB | 1307486 | | 2/1973 | H01H 39/00 |

OTHER PUBLICATIONS

German Patent Office, Office Action, Application No. 102010035684.0, dated Jun. 21, 2011, 8 pages.

State Intellectual Property Office of Peoples Republic of China, Office Action, Application No. 201180041567.8, dated Jun. 16, 2014, 6 pages.

State Intellectual Property Office of Peoples Republic of China, English Translation—Office Action, Application No. 201180041567.8, 8 pages, Jun. 16, 2014.

* cited by examiner

ELECTRICAL DISCONNECTING DEVICE AND METHOD FOR THE ELECTRICAL ISOLATION OF CONNECTING PARTS WITH THE AID OF A DISCONNECTING DEVICE

The subject matter concerns an electrical disconnecting device comprising a first connecting part, a second connecting part, a disconnection point which in its closed state forms a current path between the first and the second connecting parts and is located spatially between the connecting parts, wherein in its disconnected state the disconnection point disconnects the current path between the connecting parts, and further comprising an auxiliary drive which influences disconnection of the disconnection point. The object of the invention further concerns a method for disconnects connecting parts and a high-voltage electrical installation and an electric vehicle with such a disconnecting device.

Electrical disconnecting devices, in particular for battery leads of motor vehicles, are generally known. For example, DE 10 1004 023415 A1 discloses a pyrotechnically activated disconnecting device for disconnecting a disconnection point. With the disconnecting device described there an disconnection chisel is accelerated in the direction of a disconnection point by means of a pyrotechnical auxiliary drive in such a way that the disconnection chisel is able to pierce through the disconnection point. Here the disconnection point is a taper between two connecting parts. The disadvantage here, however, is that between the pyrotechnical auxiliary drive and the disconnection chisel a gas volume is disposed, which is compressible. This can mean that not all the energy of the pyrotechnical auxiliary drive is transferred promptly to the disconnection chisel and the isolation may not work.

Furthermore with current high-voltage applications, in particular in 48 V systems, as well as in the power trains of motor vehicles, in which the propulsion of the vehicle is performed electrically, for example in power trains of more than 100 V, the disconnection of the leads is problematical in that when the leads are disconnected from each other arcing takes place across the gap 24 at the disconnection point and the electrical disconnection is thus incomplete. These arcs can last for several seconds, during which the connecting parts at least to some extent remain electrically connected with one another and current flows across the disconnection point. This problem also occurs in the abovementioned disclosure.

For this reason the object underlying the subject matter was to provide an electrical disconnecting device, which ensures a reliable disconnection with a small-dimensioned auxiliary drive. A further object was to enable disconnection without arcing.

These and other objects are solved according to the subject-matter by an electrical disconnecting device according to claim 1.

The electrical disconnecting device has two connecting parts. The connecting parts can be formed for connection to electrical leads and cables and have cable shoes for accommodating the cable. The connecting parts can also be integrated into an on-board electrical system. Via the connecting parts and a disconnection point in the closed state of the disconnecting device an electrical current flows between a consumer and a power source. The consumer is in particular an electric motor and the power source the electric battery which drives the electric motor. This is conceivable in particular in the case of the use of batteries for hybrid vehicles or for pure electric vehicles.

In the event of an accident or other damage it must be ensured that the battery is disconnected from the consumer thereby reducing the danger to the rescue services or occupants. This is of particular interest in particular where high voltage batteries are used for electric vehicles or hybrid vehicles, since in these voltages in excess of 50 volts, in particular in excess of 100 Volts, can be present on the battery terminals. Such voltages, together with the extremely high currents made available by the batteries, constitute an enormous risk to both occupants and rescue services.

In order to guarantee a reliable isolation, it is proposed that a flowable medium driven by the auxiliary drive is disposed in such a way that it surrounds the disconnection point at least partially at least at the moment of isolation.

The flowable medium preferably has the property of being incompressible. By means of the auxiliary drive the flowable medium is pushed in the direction of the disconnection point such that it breaks open the disconnection point and surrounds the disconnection point. Because the flowable medium preferably is incompressible, it is possible to design the auxiliary drive to be as small as possible. The entire energy of the auxiliary drive is exerted directly on the disconnection point.

Because the flowable medium at least partially flows around the disconnection point at the moment of disconnection, it is ensured that in the air gap formed between the two connecting parts the flowable medium spreads out. In this way the occurrence of arcing can be suppressed or an arc that has occurred can be extinguished.

According to an embodiment it is proposed that the flowable medium exerts a pressure and/or pulse on the disconnection point that brings about the disconnection and/or that the flowable medium bears on the disconnection point immediately prior to disconnection.

The flowable medium is pushed in the direction of the disconnection point by the auxiliary drive, so that it can exert a pressure on the disconnection point which is great enough that the disconnection point breaks up. The compressive strength of the disconnection point can be designed such that it is below the pressure exerted by the flowable medium when the auxiliary drive has been activated.

The flowable medium can also be accelerated against the disconnection point with a pulse so that the pulse from the flowable medium causes the disconnection point to break up. In both cases the current path between the connecting parts is disconnected by means of the disconnection point. The flowable medium flows around the essential parts of the disconnection point and this causes the suppression or extinguishing of any arcing.

At the moment of disconnection and/or immediately prior to the disconnection the flowable medium can bear on the disconnection point, and in particular be in contact with it. In this case between the flowable medium and the disconnection point at the moment of disconnection there is no compressible gas, so that the flowable medium bears directly on the disconnection point and the pulse of the flowable medium impinges directly on the disconnection point. In this way a particularly reliable disconnection of the disconnection point occurs.

According to an embodiment it is proposed that the flowable medium is accelerated by the auxiliary drive in the direction of the disconnection point bringing about disconnection. The auxiliary drive is activated and exerts a force on the flowable medium. This force leads to an acceleration of the flowable medium, which leads to the flowable medium being accelerated in the direction of the disconnection point. The accelerated, flowable medium has a pulse which is great enough to bring about the isolation of the disconnection point.

It is also proposed that the flowable medium is disposed in a guide housing. The guide housing can form a channel between the auxiliary drive and the disconnection point, in which the medium can be disposed. The flowable medium can be disposed in the guide housing between the disconnection point and the auxiliary drive and/or at a side of the disconnection point turned away from the auxiliary drive.

It is possible for the flowable medium to be disposed between the disconnection point and the auxiliary drive. In this case following activation of the auxiliary drive a pressure can be exerted in the direction of the disconnection point on the flowable medium and/or the flowable medium accelerated in the direction of the disconnection point. The energy of the auxiliary drive is thus channelled in the direction of the disconnection point by the flowable medium, thereby causing a disconnection of the disconnection point.

It is also possible for the auxiliary drive to cause an isolation of the disconnection point and at the moment when the disconnection point breaks up the flowable medium on the side turned away of the disconnection point surrounds this at least partially and similarly extinguishes any arcing that occurs or suppresses any arcing.

The auxiliary drive can exert both a force in the direction of the disconnection point and a force directed away from the disconnection point. For example, the auxiliary drive can explode or implode. In the case of explosion the force is directed in the direction of the disconnection point and the flowable medium is accelerated in the direction of the disconnection point or the disconnection point is broken up and the flowable medium is located on the side of the disconnection point turned away from the auxiliary drive. In the event of implosion it is possible that as a result of the implosion force a depression occurs in the guide housing, as a result of which the disconnection point is broken up and that the flowable medium disposed on the side of the disconnection point turned away from the auxiliary drive surrounds the disconnection point.

It is also proposed that the flowable medium is a liquid or a free-flowing bulk material, in particular sand, and/or that the flowable medium is liquid, paste-like, foam-like, gel-like or granular.

It has been shown that various media can be used for the disconnection according to the subject-matter. It is essential that the media are flowable and in particular incompressible media are suitable for the solution according to the subject-matter. Incompressible media are in particular liquids or free-flowing bulk goods, which in particular are substantially incompressible. However, free-flowing bulk goods can also be used which are partially compressible. A possible medium that can be used is sand. Sand has exceptional extinguishing qualities and is therefore particularly suitable for extinguishing arcs.

Liquid, paste-like, foam-like or gel-like media can also be used. Thus, for example, it is possible to use silicones. Silicones are gel-like and/or paste-like. The silicone used preferably has a high thermal stability. The use of silicone as a flowable medium in particular is particularly advantageous because of its isolating and heat conducting property. The silicone also has a particularly good arc-extinguishing property.

Silicone is particularly advantageous as an electrical isolator, since following isolation it isolates the disconnection point particularly reliably and prevents a current flow via the silicone taking place between connecting parts.

In operation the use of silicone is in particular advantageous because it has good heat conducting properties. When high currents pass over the disconnection point this is heated through ohmic losses. With a silicone, which surrounds the disconnection point, this thermal energy can then be dissipated particularly well, if the silicone has a good thermal conductivity. This leads to the disconnection point being better cooled than if for example it were surrounded by air. In this way the current-carrying capability of the disconnection point is considerably increased.

In the event of disconnection, the disconnection point is opened and at high currents arcing can occur. If silicone is used, which as a flowable medium flows between the disconnection point, by means of the silicone the arcing can be extinguished. The silicone preferably has a self-extinguishing property and is non-flammable. At a flashpoint in excess of 400°, preferably in excess of 600°, particularly preferably in excess of 700°, for example at 750° and an ignition temperature of in excess of 300°, preferably in excess of 400°, particularly preferably at 450°, the silicone can be said to be non-flammable. Silicone also has a low oxygen content and an oxygen index (LOI) of in excess of 15%, preferably in excess of 20%, particularly preferably in excess of 25%.

In the area of the arc to be extinguished as a result of the silicone only a small amount of smoke forms. The combustion gases are substantially carbon dioxide and water without toxic gases. The combustion product can be a silicon oxide which as a dielectric has a particularly good electrically insulating effect.

The flame retardant effect and behaviour in fire of silicone can be improved by the addition of $AL(OH_3)$ and $TIO_2$.

Purely by way of example SIL-Gel® 612 from Wacker Chemie AG can be indicated as the flowable medium. It has a viscosity of approximately 1 000 mPas at 23° C. and a density of approximately 0.9 g/cm$^3$.

Elastosil® RT745 from Wacker Chemie AG is also a product that can be used, and has the same viscosity and density.

As a further example of a possible silicone gel the product RAKU-SIL® 10-S12/3-2 is proposed. This product also has a viscosity of between 5 000 and 11 000 mPas at a density of 0.98 g/ml.

The ageing characteristics of the flowable medium are of decisive importance, in particular for electrical disconnecting devices in automobile manufacture. In case of doubt, the flowable medium must maintain the same mechanical characteristics over the entire lifetime of a vehicle, and the viscosity in particular must remain the same. This is the case with the abovementioned products. It is important that the silicone gel is resistant to ageing. In particular the silicone gel has the same mechanical characteristics between −40° C. and +150° C.

The medium used can for example be fluid or gel-like in a temperature range of between −40° C. and +150° C. At low temperatures the flowable medium must in particular still be flowable when used in electric vehicles. The flowable medium should not change its physical state to a solid at −40° C., since otherwise the isolation of the disconnection point is jeopardised.

The flowable medium in particular has a viscosity of between 0.2 and 1*10^5, particularly preferably between 0.2 and 1 000 or also in excess of 1 000. The viscosity is as a rule measured in mPa*s. The flowable medium is preferably viscous and/or free-flowing. The medium is preferably a two-component mixture which in the mixed state has the abovementioned viscosity.

According to an embodiment it is proposed that the flowable medium has electrically insulating properties and/or arc extinguishing properties. As already mentioned, sand is particularly suitable for extinguishing arcs. Silicones are also particularly suitable for extinguishing arcs. Silicones also have isolating properties. In technical circles other materials are also known, that are both flowable and good electrical insulators.

According to an embodiment it is proposed that the auxiliary drive is a pyrotechnical auxiliary drive or a mechanical auxiliary drive. It is also proposed that the auxiliary drive brings about a depression or overpressure in the guide housing following its activation.

A pyrotechnical auxiliary drive is characterised by a pyrotechnical propellant, which when triggered creates a pressure pulse generating a pressure pulse that drives the flowable medium. The triggering of the pyrotechnical auxiliary drive can take place via an ignition lead.

A mechanical auxiliary drive can for example be a foam, which upon contact with another material, for example water, expands rapidly thereby exerting a pressure pulse on the flowable medium for isolating the disconnection point. A highly tensioned spring can also be used as the mechanical auxiliary drive. Other mechanical auxiliary drives are similarly possible.

As mentioned above, the auxiliary drive can trigger a depression or overpressure in the guide housing following activation. Imploding or exploding auxiliary drives are for possible for example. Depending on whether an overpressure or depression is exerted, the flowable medium can at least be disposed either on the side of the disconnection point turned towards the auxiliary drive or the side turned away from the auxiliary drive. It is important that the flowable medium at least partially surrounds the auxiliary drive following isolation or at the moment of isolation.

According to an embodiment it is proposed that a guide housing has a space disposed between the auxiliary drive and the disconnection point and/or on a side of the disconnection point turned away from the auxiliary drive. A guide housing can be provided, in which the auxiliary drive together with the flowable medium of the disconnection point is disposed. Between the auxiliary drive and the disconnection point a space can be disposed in the guide housing, e.g. a channel. In this space the flowable medium can be disposed. It is also possible that on the side of the disconnection point turned away from the auxiliary drive a space is disposed. Here also the flowable medium can be disposed. The flowable medium can be disposed both in front of and behind the disconnection point, seen from the auxiliary drive. The space behind the disconnection point can be bigger than the space in front of the disconnection point and dimensioned such that the disconnection point at the moment of disconnection can spread out into the space turned away from the auxiliary drive.

As explained above, it is proposed that the flowable medium can be disposed at least partially in the space. It is preferable that between the auxiliary drive and the disconnection point as little gas as possible is disposed. This ensures that the energy of the auxiliary drive as far as possible has an undamped effect on the flowable medium and thus a reliable disconnection can take place. Because the space is filled by the flowable medium, this can surround the disconnection point at the moment of disconnection.

According to an advantageous exemplary embodiment it is proposed that in the area of the space a vent opening is provided, via which a gas enclosed in the space can escape in the event of overpressure. The vent opening can be disposed both in the space between the auxiliary drive and the disconnection point and in the space of the side of the disconnection point turned away from the auxiliary drive. The vent opening can also be disposed between the flowable medium and the disconnection point, so that a gas volume, which can be present between the medium and the disconnection point, at the moment of triggering can escape through the vent opening.

The space which is disposed on the side of the disconnection point turned away from the auxiliary drive can be in two parts. Here an isolation layer/dividing wall, for example a thin sheet, a sheet coated with insulator, a plastic panel or similar, can divide the space in two. The space preferably is divided in two in such a way that the isolation layer forms one space which does not bear on the disconnection point and another space which does bear on the disconnection point. The space which does not bear on the disconnection point can be provided with the vent opening. The space bearing on the disconnection point can then also be filled with the flowable medium. The dividing wall means that in the quiescent state the flowable medium does not escape through the vent opening. In the event of activation, that is to say if the auxiliary drive triggers, the flowable medium can sever the disconnection point. The flowable medium which then enters the space bearing on the disconnection point initially is unable to spread out. The dividing wall is similarly severed in the event of activation by the ignition energy of the auxiliary drive and the pressure of the flowable medium and fluid communication occurs between the two chambers, which were initially isolated by the dividing wall. In the event of disconnection the flowable medium can then enter the other space and pressure equalisation takes place, preferably via the vent opening. This increases the reliability of the disconnection, since in the space, turned away from the auxiliary drive, there is no resultant overpressure. On the other hand, normally the medium is prevented from escaping through the vent opening.

If the vent opening is disposed between the auxiliary drive and the disconnection point, a gas which is disposed in this space, can leave the space following activation of the auxiliary drive. This causes the compressible gas to leave the area between the auxiliary drive and the disconnection point and the energy of the auxiliary drive substantially impinges on the flowable medium so that a reliable disconnection is brought about. This is in particular useful where a bolt or pin is used, as described below.

If the opening is disposed on the side of the disconnection point turned away from the auxiliary drive, then an overpressure, which results when the disconnection point is disconnected, can escape particularly easily from the space and the gas present in the side of the disconnection point turned away from the auxiliary drive cannot exert any counter-pressure on the disconnection point which could prevent a reliable disconnection.

In order to bring about a reliable disconnection, the disconnection point must have a lower ultimate strength than the housing or the connecting parts. For this reason it is proposed that the disconnection point is a predetermined breaking point, wherein the predetermined breaking point in particular is at least a tapering of the disconnection point or a soldered joint between the connecting parts. The dividing line should run along the disconnection point between the connecting parts with the formation of the gap between the connecting parts, which isolates the current path. This gap runs along the disconnection point. The predetermined breaking point can for example be a taper along a line across the surface of a connecting part. Connecting parts can also be soldered together thereby forming the disconnection point. It is also possible for the disconnection point at, at least, two points to in each case have a tapered connection with a respective connecting part and for the tapers to be broken open by the pressure from the flowable medium and the disconnection point to be released from the connecting parts.

In order to allow a clean bending line at the disconnection point, it is proposed that the disconnection point is notched in respect of each connecting part, in such a way that the respective notch runs along a predetermined bending line of the disconnection point. The predetermined bending line defines where the disconnection point is to be bent. In this way it is possible to accurately define how much space the disconnection point takes when opening so that this space can be made available in the guide housing. This also allows a better determination of the necessary force that has to be exerted on the disconnection point until it breaks.

As already explained, in particular for high voltage applications, suppression of arcing is relevant. But the interruption or arcing is also relevant if high currents flow via the connecting parts. For this reason it is proposed that the disconnection point has a current-carrying capability of more than 10 A, preferably of more than 20 A, particularly preferably of more than 100 A. In this case the disconnection point is suitable for supporting currents from electric drives. The disconnection point is also suitable for supporting starter currents and starters of combustion engines.

According to an embodiment it is proposed that a potential difference of more than 24 Volts, preferably of more than 100 Volts exists across the disconnection point following disconnection. It is precisely in high voltage applications that the occurrence of arcing is a problem, so that the disconnecting device according to the subject-matter is relevant precisely in such applications.

In order to particularly efficiently direct the energy given off by the auxiliary drive in the event of activation co the flowable medium, it is proposed that in the space a bolt or pin is disposed that can be displaced along the axial direction of extension of the space. The bolt and the pin can be accelerated by the pressure pulse of the auxiliary drive in the direction of the flowable medium and exert a pressure on this which is sufficient to isolate the disconnection point. In addition the bolt prevents a gas bubble that may for example form in front of the auxiliary drive in the event of activation from moving through the flowable medium in the direction of the end position, without the flowable medium being accelerated sufficiently in the direction of the disconnection point.

According to an embodiment it is also proposed that the bolt or the pin driven by the auxiliary drive accelerates the flowable medium in the direction of the disconnection point or increases the pressure within the flowable medium.

A further aspect is a high voltage electrical installation with a disconnecting device, as described above.

A further subject matter is an electric vehicle, in particular a hybrid vehicle, with an onboard electrical drive system and a disconnecting device disposed within the onboard electrical drive system, as described above.

A further aspect is a method for electrical disconnection of two connecting parts with the aid of a disconnecting device, wherein an auxiliary drive is activated, the auxiliary drive exerts a pressure on a flowable medium in such a way that by means of the flowable medium disconnection of the disconnecting device is brought about, and the flowable medium at the moment of the disconnection at least partially surrounds at least parts of the disconnecting device.

It is also proposed that an arcing which forms between the connecting parts at the moment of disconnection is extinguished by the flowable medium or the occurrence of arcing is suppressed by the flowable medium.

The features of the independent claims can be freely combined with one another and with all features of the dependent claims. In addition, all features of the dependent claims can be freely combined with one another, in particular avoiding the features of the independent claims, and in so doing can likewise result in inventive combinations.

In the following the subject matter of the invention is explained in more detail by means of a drawing showing embodiments. The drawing shows as follows.

Figure 1:
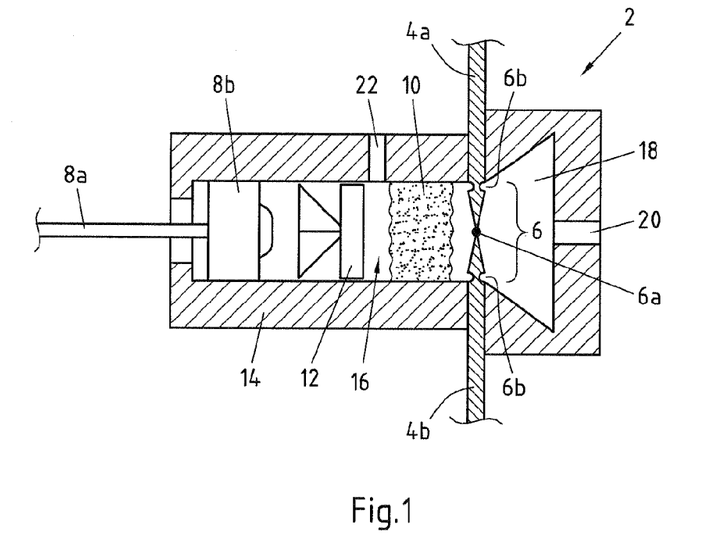
FIG. 1 a first disconnecting device according to a first embodiment in the non-activated state.

FIG. 1 shows a disconnecting device 2 with a housing 14. Into the housing 14 two connecting parts 4a and 4b protrude, via which a current path runs, via a disconnection point 6, and via which a current of more than 10 A can flow. The disconnection point 6 has predetermined breaking point 6a which according to FIG. 1 is a soldered joint.

In the housing 14 a pyrotechnical auxiliary drive 8b controllable via an ignition lead 8a is disposed. Between the pyrotechnical auxiliary drive 8b and the disconnection point 6 a bolt 12 is disposed, which is movable along the axial direction of the guide housing 14 in a channel of the guide housing 14. Furthermore, between the auxiliary drive 8b and the disconnection point 6 a flowable medium 10 is disposed.

The flowable medium 10 can be a liquid, a gel or a free-flowing bulk material. As an example the flowable medium 10 can be a silicone or sand. Between the bolt 12 and the disconnection point 6 an intermediate space 16 is formed, which as shown can at least partially be filled with the flowable medium 10.

In the intermediate space 16 a gas can be present between the bolt 12 and the flowable medium 10. In order to be able to vent this gas in the event of activation, a vent opening 22 is provided. The vent opening 22 is small enough that the flowable medium 10 cannot escape through it. However, the vent opening 22 is large enough for a gas overpressure to be able to escape from the space 16.

On the side of the disconnection point 6 facing away from the auxiliary drive 8b a space 18 is similarly provided in which a vent opening 20 can be disposed. It should be noted that at the disconnection point 6 in the area of the inner periphery of the guide housing 14 notches 6b can be provided, defining predetermined bending lines, along which the disconnection point 6 is to be bent.

It will further be noted that the space 18 has a volume expanding radially, in which the disconnection point 6 can be bent, as will be shown in the following.

Figure 2:
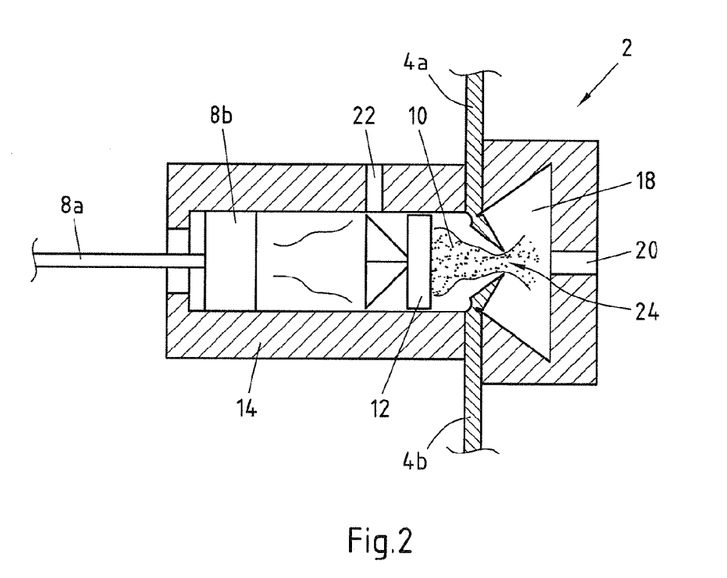
FIG. 2 the disconnecting device according to FIG. 1 in the activated state.

FIG. 2 shows the disconnecting device 2 according to FIG. 1 in the triggered state. In the triggered state via an ignition lead 8a an ignition pulse is passed to the auxiliary drive 8b which then explodes. The explosion energy acts as a pressure pulse on the bolt 12. The bolt 12 is accelerated in the direction of the flowable medium 10. A gas in the intermediate area between bolt 12 and flowable medium 10 can be vented via the vent opening 22, so that the gas has little or no braking effect on the bolt 12.

The bolt 12 meets with the flowable medium 10 and accelerates this in the direction of the disconnection point 6. As will be noted, the pressure and the pulse of the flowable medium 10 are sufficient to break open the disconnection point 6, so that a gap 24 results between the connecting parts 4a, 4b. The flowable medium 10 penetrates into this gap 24.

At the moment of disconnection of the connecting parts 4a, 4b by means of the disconnection point 6 arcing occurs across the gap 24. This arcing is extinguished immediately it occurs by the flowable medium 10 or the occurrence of arcing is fully suppressed. The overpressure occurring in the housing 18, which results from the bending of the disconnection point 6 in the manner shown, can escape via the vent opening 20.

With the aid of the flowable medium 10 it is possible to prevent the occurrence of an arc along the gap 24 or to extinguish arcing that has occurred.

Figure 3:
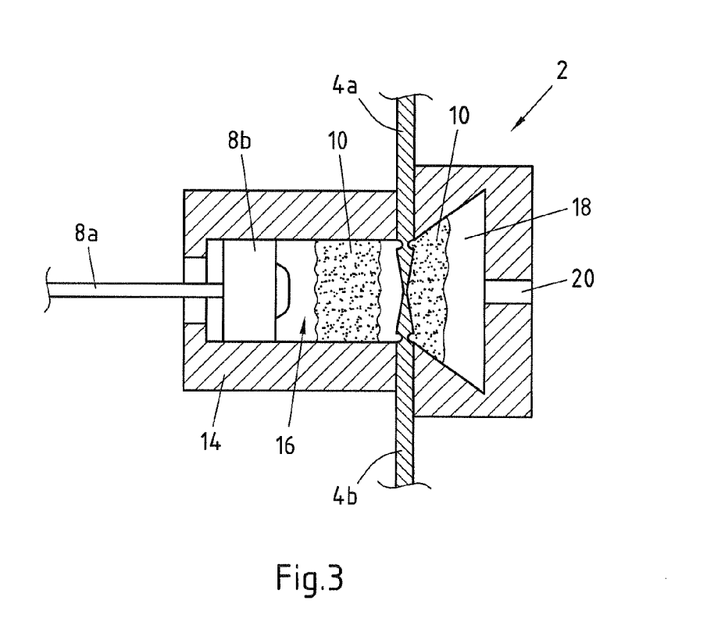
FIG. 3 a second disconnecting device according to a second embodiment in the non-activated state.

FIG. 3 shows a further embodiment of a disconnecting device 2, in which the flowable medium 10 is also disposed on the side of the disconnection point 6 facing away from the auxiliary drive 8b in the space 28. It will also be noted that unlike the embodiment according to FIG. 1, the disconnection point 6 in the area of the predetermined breaking point 6a is not soldered, but is merely tapered.

Figure 4:
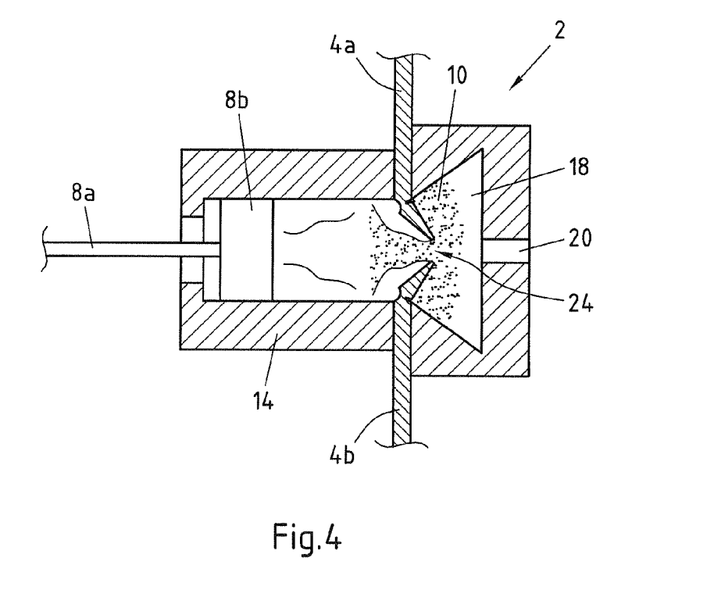
FIG. 4 the disconnecting device according to FIG. 3 in the activated state.

Upon triggering of the disconnecting device 2 according to FIG. 3, the disconnection point 6, as shown in FIG. 4, is similarly disconnected.

FIG. 4 shows the disconnecting device 2 according to FIG. 3 in the triggered state. It will be noted that the auxiliary drive 8b has ignited and the flowable medium 10 has been accelerated towards the disconnection point 6 in such a way as to isolate the disconnection point 6 with the creation of the gap 24. It will also be noted that the flowable medium 10 completely surrounds the gap 24 at the disconnection point 6, and any arcing that occurs can be extinguished.

Figure 5:
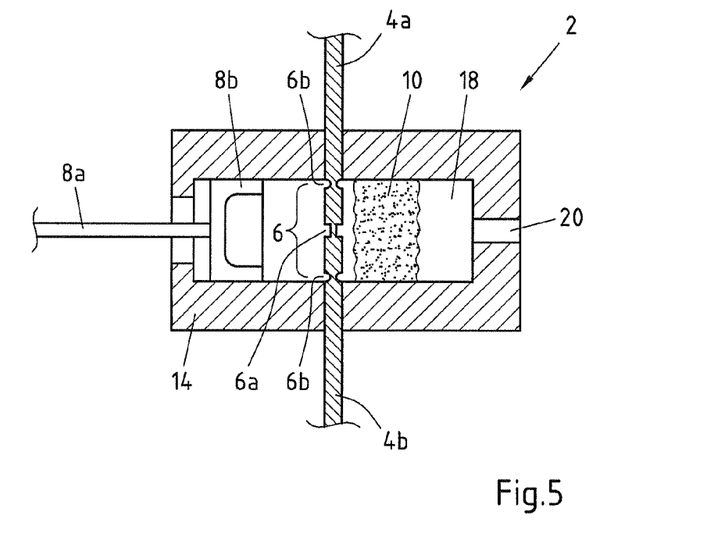
FIG. 5 a third disconnecting device according to a third embodiment in the non-activated state.

FIG. 5 shows a further embodiment of a disconnecting device 2, in which the flowable medium 10 is disposed exclusively on the side of the disconnection point 6 turned away from the auxiliary drive 8b. In the example shown in FIG. 5 the disconnection point 6 also has a predetermined breaking point 6a in the form of a taper. The auxiliary drive 8b is such that it implodes upon activation and causes a depression in the space 16.

Figure 6:
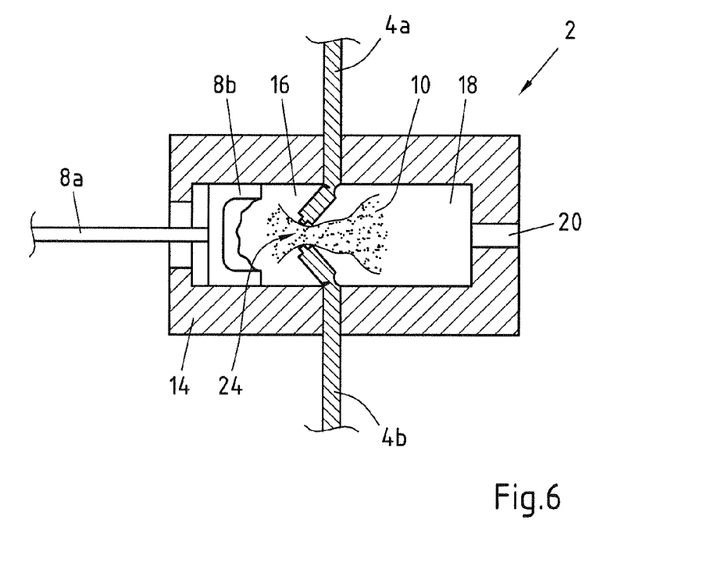
FIG. 6 the disconnecting device according to FIG. 5 in the activated state.

An activated disconnecting device according to FIG. 5 is illustrated in FIG. 6. It will be noted that as a result of the depression resulting in the space 16 the disconnection point 6 breaks open and a gap 24 is created between the connecting parts 4a, 4b. At the moment of disconnection the flowable medium 10 penetrates into this gap 24, which prior to the implosion was disposed in the space 18. By means of the vent opening 20 gas can reach the inside of the space 18, so that the depression in the space 16 leads to the disconnection point 6 breaking open and the gap 24 forming. Here also it will be noted that the flowable medium 10 is located in the area of the gap 24 and any arcing that occurs can be extinguished.

Figure 7:
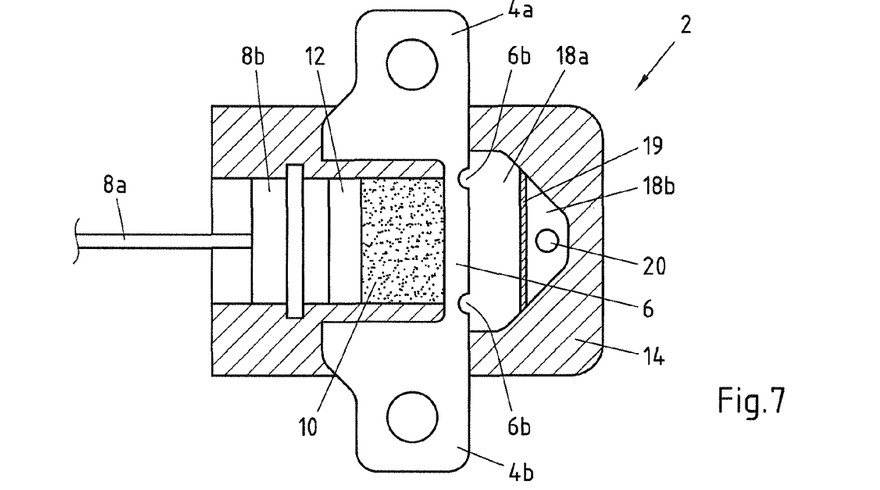
FIG. 7 a further disconnecting device according to a further embodiment in the non-activated state.

FIG. 7 shows a further disconnecting device according to a further embodiment.

With the disconnecting device 2 shown the connecting parts 4a, 4b, are designed as flat parts and in each case have drill holes for the connection of cables, in particular using screws.

In the guide housing 14 a pyrotechnical ignition pill 8b is disposed, which is activated by means of an ignition lead 8a.

In a channel between the ignition pill 8b and the disconnection point 6 there is a bolt 12 directly on the ignition pill 8b. Between the bolt 12 and the disconnection point 6 the flowable medium 10 is provided.

The flowable medium is preferably a silicone gel. This silicone gel is paste-like or gel-like. The flowable medium 10 bears directly on the disconnection point 6 and leads to heat dissipation of the Joulean heat at the disconnection point 6 resulting from the current flow between the connecting parts 4a and 4b. In this way the current-carrying capability of the disconnection point 6 is considerably increased. On the side of the disconnection point 6 facing away from the ignition pill 8b there is a space 18, which is split into two chambers 18a and 18b. The chambers 18a and 18b are isolated from one another by a dividing wall 19. The dividing wall 19 can be a membrane or other thin skin, a thin sheet preferably with a sheet coated with an insulator, or a plastic covering or a plastic panel, which seals the chamber 1ea from the chamber 18b, such that moisture or other environmental influences penetrating through the opening 20 from outside do not penetrate into the chamber 18a and in particular do not cause any corrosion at the disconnection point 6.

The dividing wall 19 is preferably flexible and serves firstly to seal the chamber 18b from chamber 18a, and secondly however to also absorb the overpressure occurring in the event of activation in the chamber 18a, in that the dividing wall 19 bends or even ruptures and thus any overpressure in the chamber 18a escapes through the opening 20.

The flowable medium 10 can likewise be disposed in the chamber 18a. In this way the current-carrying capability across the disconnection point 6 is further increased, since further improved heat dissipation is ensured.

Figure 8:
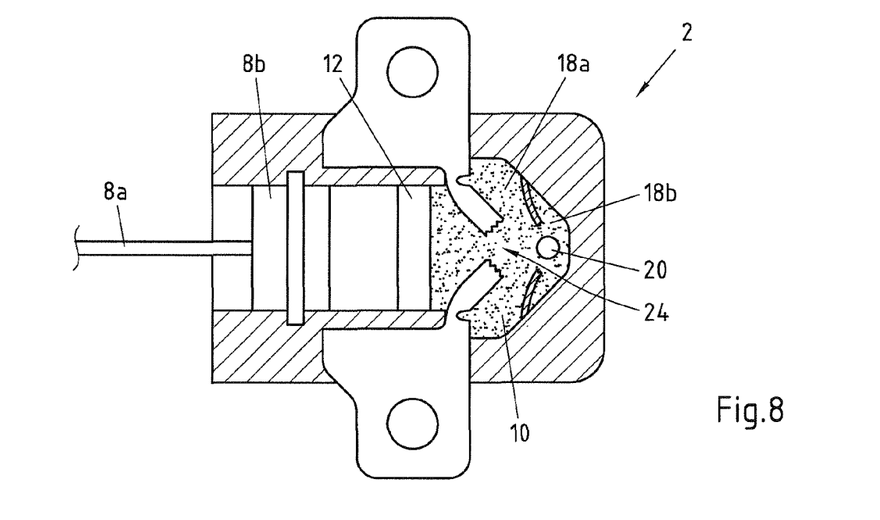
FIG. 8 the disconnecting device according to FIG. 7 in the activated state.

In the event of activation the ignition pill 8b is ignited, upon which the bolt 12 is accelerated in the direction of the flowable medium 10. The flowable medium 10 exerts a disconnecting pressure on the disconnection point 6 such that the disconnection point 6 breaks open. The disconnection point 6 is bent along the notches 6b and extends into the chamber 18a. At the moment of disconnection the flowable medium 10 flows into the gap 24, as shown in FIG. 8. Any existing arcing in the gap 24 is extinguished by the silicone gel. The product of using silicone gel is silicon oxide, which has very good fluctuation properties. The combustion of silicone gel produces only small quantities of smoke, carbon dioxide and water, with no toxic gases. Since the oxygen index is above 21%, the silicone gel is non-flammable. The resulting arc is thus immediately extinguished.

As will be further noted from FIG. 8, the dividing wall 19 is broken open by the resulting overpressure and silicone gel 10 flows into the chambers 10a and 10b. Through the opening 20 venting takes place such that any overpressure in the chambers 18a, 18b can escape. This promotes the disconnecting ability of the disconnecting device, since the pressure exerted by the flowable medium 10 on the disconnection point 6 only comes up against a low counter pressure.

With the aid of the disconnecting devices shown in FIGS. 7 and 8 the disconnecting behaviour is further improved and the vent opening 20 is sealed in respect of the disconnection point 6 thereby considerably increasing the life of the disconnecting device.

Figure 9:
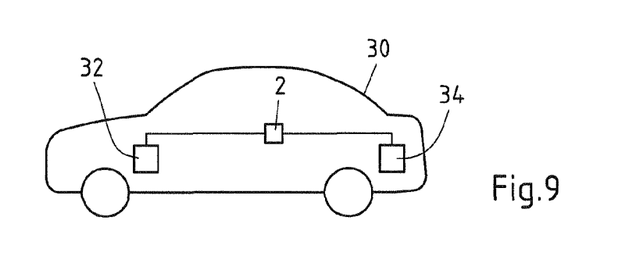
FIG. 9 an electric vehicle with a disconnecting device according to the invention.

FIG. 9 shows an electric vehicle 30 with a traction battery 32 and an electric drive 34. The disconnecting device 2 is disposed between the traction battery 32 and the electric drive 34. In the event of an accident involving the vehicle 30 the electrical disconnecting device 2 can be activated and the current path between the battery 32 and the drive 34 can be disconnected. Here the disconnecting device 2 can be disposed particularly close to the battery 32, for example directly alongside the battery terminals. This ensures that the danger to the rescue services or occupants is minimised.

The invention claimed is:

1. Electrical disconnecting device comprising:
   a first connecting part;
   a second connecting part;
   a disconnection point which in the closed state forms a current path between the first and the second connecting parts and is located spatially between the connecting parts, wherein in the isolated state the disconnection point isolates the current path between the connecting parts;
   an auxiliary drive which influences isolation of the disconnection point, wherein a flowable medium driven by the auxiliary drive is disposed in such a way that it is in direct contact with the disconnection point at least at the moment of mechanical disconnection of the first and the second connecting parts from one another;
   a guide housing having a space disposed between the auxiliary drive and the disconnection point and/or on a side of the disconnection point turned away from the auxiliary drive; and
   a bolt or pin disposed in the guide housing that can be displaced in the axial direction of extension of the guide housing, the bolt or pin driven by the auxiliary drive to accelerate the flowable medium in the direction of the disconnection point, wherein the flowable medium is accelerated by the auxiliary drive in the direction of the disconnection point to exert pressure on the disconnection point and wherein the flowable medium upon direct contact with the disconnection point causes the disconnection point to mechanically disconnect the first and the second connecting parts from one another.

2. Disconnecting device of claim 1, wherein the flowable medium bears on the disconnection point immediately prior to isolation.

3. Disconnecting device of claim 1, wherein the flowable medium is disposed in the guide housing between the disconnection point and the auxiliary drive and/or at a side of the disconnection point turned away from the auxiliary drive.

4. Disconnecting device of claim 1, wherein the flowable medium is sand.

5. Disconnecting device of claim 1, wherein the flowable medium has electrically insulating properties and/or arc extinguishing properties.

6. Disconnecting device of claim 1, wherein the auxiliary drive is a pyrotechnical auxiliary drive or a mechanical auxiliary drive and/or that the auxiliary drive brings about a depression or overpressure in a guide housing following its activation.

7. Disconnecting device of claim 1, wherein the space is at least partially filled with the flowable medium.

8. Disconnecting device of claim 1, wherein in the area of the space a vent opening is provided, via which the gas enclosed in the space can escape in the event of overpressure in the space.

9. Disconnecting device of claim 8, wherein the space disposed on a side of the disconnection point turned away from the auxiliary drive comprises a first chamber and a second chamber, wherein the first chamber bears on the disconnection point and the second chamber is sealed with respect to the disconnection point by a dividing wall.

10. Disconnecting device of claim 9, wherein the vent opening is provided in the second chamber.

11. Disconnecting device of claim 1, wherein the disconnection point has a predetermined breaking point, wherein the predetermined breaking point comprises at least one tapering of the disconnection point or one soldered joint between the connecting parts.

12. Disconnecting device of claim 1, wherein the disconnection point is notched in respect of each connecting part, in such a way that the respective notch runs along a predetermined bending line of the disconnection point.

13. Disconnecting device of claim 1, wherein the connecting parts and the disconnection point have a current-carrying capability of more than 10 Amps.

14. Disconnecting device of claim 1, wherein across the disconnection point of the disconnecting device following isolation a potential difference of more than 100 Volts exists.

15. A high voltage electrical installation including a disconnecting device of claim 1.

16. An electric vehicle with an onboard electrical drive system and a disconnecting device of claim 1 disposed within the onboard electrical drive system.

17. Disconnecting device of claim 1, wherein the flowable medium is liquid, paste-like, foam-like, gel-like or granular.

18. Disconnecting device of claim 1, wherein the connecting parts and the disconnection point have a current-carrying capability of more than 100 Amps.

19. Method for electrical isolation of two connecting parts with the aid of a disconnecting device comprising:
   activating an auxiliary drive, wherein the auxiliary drive exerts a pressure on a flowable medium in such a way that by means of the flowable medium isolation of the disconnecting device is brought about, and wherein the flowable medium at the moment of the isolation is in direct contact with the disconnecting device, a guide housing having a space disposed between the auxiliary drive and the disconnection point and/or on a side of the disconnection point turned away from the auxiliary drive, a bolt or pin disposed in the guide housing that can be displaced in the axial direction of extension of the guide housing; and
   driving the bolt or pin with the auxiliary drive to accelerate the flowable medium in the direction of the disconnection point, wherein the flowable medium is accelerated by the auxiliary drive in the direction of the disconnection point to exert pressure on the disconnection point, and
   wherein the flowable medium upon direct contact with the disconnection point causes the disconnection point to mechanically disconnect the first and the second connecting parts from one another.

20. Method of claim 19, wherein an arc forming between the connecting parts at the moment of isolation is extinguished by the flowable medium or the occurrence of arcing is suppressed by the flowable medium.

21. Electrical disconnecting device comprising:
   a first connecting part;
   a second connecting part;
   a disconnection point which in the closed state forms a current path between the first and the second connecting parts and is located spatially between the connecting parts, wherein in the isolated state the disconnection point isolates the current path between the connecting parts;
   an auxiliary drive which influences isolation of the disconnection point, wherein a flowable medium driven by the auxiliary drive is disposed in such a way that it surrounds the disconnection point at least partially at least at the moment of isolation;
   a guide housing having a space disposed on a side of the disconnection point turned away from the auxiliary drive, wherein in the area of the space a vent opening is provided, via which gas enclosed in the space can escape in the event of overpressure in the space, wherein the space comprises a first chamber and a second chamber, wherein the first chamber bears on the disconnection point and the second chamber is sealed with respect to the disconnection point by a dividing wall; and a bolt or pin disposed in the guide housing that can be displaced in the axial direction of extension of the guide housing, the bolt or pin driven by the auxiliary drive to accelerate the flowable medium in the direction of the disconnection point, wherein the flowable medium is accelerated by the auxiliary drive in the direction of the disconnection point to exert pressure on the disconnection point bringing about the isolation.

* * * * *